US010931105B2

(12) United States Patent
Barker et al.

(10) Patent No.: US 10,931,105 B2
(45) Date of Patent: Feb. 23, 2021

(54) POWER TRANSMISSION NETWORK

(71) Applicant: General Electric Technology GmbH, Baden (CH)

(72) Inventors: Carl David Barker, Stafford (GB); Pablo Briff, Stafford (GB); Francisco Jose Moreno Munoz, Navarra (ES); Rosemary King, Stafford (GB)

(73) Assignee: General Electric Technology GmbH, Baden (CH)

(*) Notice: Subject to any disclaimer, the term of this patent is extended or adjusted under 35 U.S.C. 154(b) by 127 days.

(21) Appl. No.: 16/316,231

(22) PCT Filed: Jul. 6, 2017

(86) PCT No.: PCT/EP2017/066921
§ 371 (c)(1),
(2) Date: Jan. 8, 2019

(87) PCT Pub. No.: WO2018/007516
PCT Pub. Date: Jan. 11, 2018

(65) Prior Publication Data
US 2019/0245346 A1 Aug. 8, 2019

(30) Foreign Application Priority Data
Jul. 8, 2016 (EP) ..................... 16178684

(51) Int. Cl.
*H02J 1/12* (2006.01)
*H02J 1/08* (2006.01)
(Continued)

(52) U.S. Cl.
CPC ...... *H02J 1/12* (2013.01); *H02J 1/08* (2013.01); *H02J 1/102* (2013.01); *H02J 3/36* (2013.01); *Y02E 60/60* (2013.01)

(58) Field of Classification Search
CPC ...... H02J 1/12; H02J 1/08; H02J 1/102; H02J 3/36
(Continued)

(56) References Cited

FOREIGN PATENT DOCUMENTS

WO   20120443669 A1   4/2012

OTHER PUBLICATIONS

Zabaiou et al., VSC-OPF Based on Line Voltage Indices for Power System Losses Minimization and Voltage Stability Improvement, 2013, IEEE (Year: 2013).*

(Continued)

*Primary Examiner* — Michael R. Fin
(74) *Attorney, Agent, or Firm* — Eversheds Sutherland (US) LLP (57) ABSTRACT

A power transmission network includes converters interconnected via electrical elements, at least one power flow router, and a controller. Each power flow router being operatively connected to the electrical elements, each power flow router configured to selectively control current flow in the electrical elements so as to direct power between two or more of the plurality of converters. The controller configured to selectively control the converters and each power flow router to control power flow in the power transmission network The controller is configured to carry out a mathematical optimisation to determine optimal operating set points of the converters; after carrying out the mathematical optimisation, carry out another mathematical optimisation to determine optimal current flows in the electrical elements; and control the converters in accordance with each determined optimal operating set point, and control the power flow router(s) to achieve each determined optimal current flow in the electrical elements.

18 Claims, 5 Drawing Sheets

(51) Int. Cl.
    *H02J 3/36*     (2006.01)
    *H02J 1/10*     (2006.01)

(58) Field of Classification Search
    USPC .......................................................... 307/82
    See application file for complete search history.

(56) References Cited

OTHER PUBLICATIONS

International Search Report and Written Opinion dated Sep. 6, 2017 which was issued in connection with PCT/EP2017/066921 which was filed on Jul. 6, 2017.

Wang Sheng et. al: "Coordination of DE power flow controllers and AC/DC converters on optimizing the delivery of wind power", IET Renewable Power Generation, The Institution of Engineering and Technology Michael Faraday House, Six Hills Way Stevenage, Herts SG1 2AY, UK vol. 10, No. 6, Jun. 23, 2016.

European Search Report and Written Opinion dated Nov. 17, 2016 which was issued in connection with EP 16178684.3 which was filed on Jul. 8, 2016.

\* cited by examiner

POWER TRANSMISSION NETWORK

BACKGROUND OF THE DISCLOSURE

This invention relates to a power transmission network, and to a method of controlling power flow in a power transmission network, for use in high voltage direct current transmission.

An example of a power transmission network is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

BRIEF SUMMARY

According to a first aspect of the invention, there is provided a power transmission network comprising:

a plurality of converters interconnected via a plurality of electrical elements;

at least one power flow router, the or each power flow router being operatively connected to at least one of the plurality of electrical elements, the or each power flow router being configured to be controllable to selectively control current flow in at least one of the plurality of electrical elements so as to direct power between two or more of the plurality of converters; and a controller configured to selectively control the plurality of converters and the or each power flow router to control power flow in the power transmission network;

wherein the controller is configured to:

carry out a first mathematical optimisation to determine one or more optimal operating set points of one or more of the converters;

after carrying out the first mathematical optimisation, carry out a second mathematical optimisation to determine one or more optimal current flows in the plurality of electrical elements; and control the one or more of the converters in accordance with the or each determined optimal operating set point, and control the power flow router or at least one of the power flow routers to achieve the or each determined optimal current flow in the plurality of electrical elements.

The configuration of the controller to carry out the first mathematical optimisation permits the optimisation of the control of the selected converter(s) with regard to chosen criteria or constraints in order to achieve the object of maximising the efficiency of the operation of the power transmission network whilst operating within its ratings and meeting specified power requirements.

The interconnectivity between the plurality of electrical elements permits the configuration of the or each power flow router to not only directly control current flow in the or each connected electrical element, but also indirectly control current flow in the or each other electrical element.

The control of current flow in at least one of the plurality of electrical elements may be selected from a group including, but is not limited to:

increasing or decreasing current flow in at least one of the plurality of electrical elements;

limiting current flow in at least one of the plurality of electrical elements below a predefined current limit;

reducing current flow in at least one of the plurality of electrical elements to zero or substantially zero;

balancing the current flows in two or more of the plurality of electrical elements;

reversing current flow in at least one of the plurality of electrical elements.

The control of the or each power flow router to control current flow in at least one of the plurality of electrical elements may be carried out to meet operating requirements of the power transmission network or in response to a change in operating conditions of the power transmission network, which may correspond to normal operating conditions, abnormal operating conditions or a dynamic change in normal operating conditions.

The configuration of the controller to carry out the second mathematical optimisation not only permits control over the flow of current in the power transmission network to meet its operating requirements, but also permits optimisation of the flow of current in the power transmission network. More specifically, carrying out the aforementioned second mathematical optimisation, i.e. selecting the best current flow(s) (with regard to chosen criteria or constraints) from a set of available alternatives, allows the instantaneous calculation of the or each optimal current flow to meet a number of criteria or constraints designed to maximise the efficiency of the operation of the power transmission network whilst operating within its ratings and meeting specified power requirements.

In addition the configuration of the controller to carry out the first mathematical optimisation followed by the second mathematical optimisation provides a reliable means of enabling optimal operation of the converters while simultaneously maximising the efficiency of the operation of the power transmission network via optimal control of the or each power flow router. The second mathematical optimisation is capable of taking into account the selection of the or each determined optimal operating set point of the one or more of the converters when determining one or more optimal current flows in the plurality of electrical elements.

The configuration of the power transmission network of the invention is further advantageous in that it has the flexibility to accommodate additional criteria or constraints on the operation of the power transmission network, whereby the additional criteria or constraints may be permanent or temporary.

In addition the invention is readily scalable to accommodate different power transmission networks having different numbers of converters, electrical elements and power flow routers, and different arrangements of the converters, electrical elements and power flow routers. Such a power transmission network may be, but is not limited to, a multi-terminal DC power transmission network, a mesh-connected DC power grid or a radial-connected DC power grid.

The controller may be configured to control the one or more of the converters in accordance with the or each determined optimal operating set point by modifying a droop parameter of the one or more of the converters.

The first mathematical optimisation may include a multiple input, multiple output optimisation procedure. This provides a reliable means for determining one or more optimal operating set points of one or more of the converters.

In embodiments of the invention the controller may be configured to carry out the second mathematical optimisation by creating an equivalent power transmission network configuration which represents current flow conditions in the plurality of electrical elements. For example, an equivalent power transmission network configuration may be in the form of, but is not limited to, a model or a system of equations.

Creating an equivalent power transmission network configuration in the aforementioned manner imposes constraints on the way in which the or each power flow router can be controlled and so assists in carrying out the second mathematical optimisation to determine the or each optimal current flow.

In such embodiments creating an equivalent power transmission network configuration which represents current flow conditions in the plurality of electrical elements may include mapping converter currents in the plurality of electrical elements.

Mapping the converter currents in the plurality of electrical elements helps to tailor the control of the or each power flow router to a given topology of the power transmission network.

The second mathematical optimisation to determine one or more optimal current flows in the plurality of electrical elements may be carried out in response to a change in operating condition of the power transmission network. For example, the controller may be configured to carry out the second mathematical optimisation to determine one or more optimal current flows in the plurality of electrical elements in response to an increase or decrease in demand of power or current flow between two or more of the converters.

The second mathematical optimisation of the current flows in the plurality of electrical elements may affect the power transmission network to the extent that the optimisation of the control of the converters via the first mathematical optimisation is rendered sub-optimal.

In still further embodiments of the invention the controller may be configured to repeat the first mathematical optimisation subsequent to carrying out the second mathematical optimisation. This provides a reliable means of minimising the aforementioned effect of the second mathematical optimisation of the current flows in the plurality of electrical elements on the control of the converters.

In such embodiments the controller may be configured to implement an iterative algorithm to carry out the first mathematical optimisation and the second mathematical optimisation. This provides a reliable means for improving the outcomes of the first mathematical optimisation and the second mathematical optimisation.

The controller may be configured to implement the iterative algorithm to determine an equilibrium point between the outcomes of the first and second mathematical optimisations, and to end the iterative algorithm after determining the equilibrium point. The equilibrium point may correspond to an error between consecutive values of the outcome of the first mathematical optimisation falling within a predefined tolerance band.

In an embodiment of the invention the controller may be configured to carry out at least one of the mathematical optimisations based on one or more constraints of the power transmission network.

In such embodiments, the controller may be configured to carry out the first mathematical optimisation based on one or more constraints of the converters.

The or each constraint of the power transmission network may be selected from a group including, but is not limited to:

a real-time operating parameter of the power transmission network or a component of the power transmission network;

an operating set point of the power transmission network or a component of the power transmission network;

an operating rating of the power transmission network or a component of the power transmission network;

a physical property of the power transmission network or a component of the power transmission network;

a functional requirement of the power transmission network or a component of the power transmission network;

a performance requirement of the power transmission network or a component of the power transmission network.

The or each constraint of the power transmission network may be selected from a group including, but is not limited to:

a constraint of the converters;
a constraint of the electrical elements;
a constraint of the power flow routers.

The or each constraint of the converters may be selected from a group including, but is not limited to:

an operating current of a given converter;
an operating voltage of a given converter;
an operating power of a given converter;
a current rating of a given converter;
a voltage rating of a given converter;
a power rating of a given converter;
a droop parameter of a given converter;
an AC system frequency associated with a given converter;
a power quality rating of a given converter.

The or each constraint of the electrical elements may be selected from a group including, but is not limited to:

an operating current of a given electrical element;
an operating voltage of a given electrical element;
a temperature of a given electrical element;
a current carrying capacity of a given electrical element;
a current rating of a given electrical element;
a rate of change in current rating of a given electrical element;
a thermal rating of a given electrical element;
a voltage rating of a given electrical element;
a physical dimension of a given electrical element;
a predefined distribution of current loads between two or more of the electrical elements;
a balancing of current loads between two or more of the electrical elements;
a power quality rating of a given electrical element;
a transmission loss of a given electrical element.

The or each constraint of the power flow routers may be selected from a group including, but is not limited to:

a current rating of a given power flow router;
a voltage rating of a given power flow router;
a change of current flow controllable by a given power flow router in a given electrical element.

In embodiments of the invention the controller may be configured to carry out at least one of the mathematical optimisations based on a plurality of constraints of the power transmission network by applying a respective weighting to each of the plurality of constraints.

Applying such weightings allows variation of criteria or constraints in the power transmission network to be accommodated while continuing to optimise the operation of the power transmission network as a whole.

For example, when the plurality of constraints of the power transmission network includes respective transmission losses of the plurality of the electrical elements, applying a respective weighting to each of the plurality of constraints may include weighing the respective transmission losses of the plurality of the electrical elements by the respective resistive components of the plurality of the electrical elements.

The or each power flow router may be configured in various ways to enable it to control current flow in at least one of the plurality of electrical elements.

In embodiments of the invention, the power flow router or at least one of the power flow routers may be configured to be controllable to selectively modify an impedance of at least one of the plurality of electrical elements so as to control current flow in at least one of the plurality of electrical elements.

In further embodiments of the invention, the power flow router or at least one of the power flow routers may include at least one voltage source and may be configured to be controllable to selectively inject a voltage drop, in use, into at least one of the plurality of electrical elements so as to control current flow in at least one of the plurality of electrical elements.

The inclusion of at least one voltage source in the power flow router or at least one of the power flow routers permits injection of a voltage drop into at least one of the plurality of electrical elements. The injection of a voltage drop into an electrical element creates either a positive resistance effect in which the voltage drop opposes and thereby reduces the current flow in that electrical element, or a negative resistance effect in which the voltage drop contributes to an increase of the current flow in that electrical element. This permits regulation of current flow in at least one of the plurality of electrical elements in order to achieve a target current flow in at least one of the plurality of electrical elements.

According to a second aspect of the invention, there is provided a method of controlling power flow in a power transmission network, the power transmission network comprising:

a plurality of converters interconnected via a plurality of electrical elements; and at least one power flow router, the or each power flow router being operatively connected to at least one of the plurality of electrical elements, the or each power flow router being configured to be controllable to selectively control current flow in at least one the plurality of electrical elements so as to direct power between two or more of the plurality of converters; wherein the method comprises the step of:

controlling the plurality of converters and the or each power flow router to control power flow in the power transmission network;

wherein the method further includes the steps of:

carrying out a first mathematical optimisation to determine one or more optimal operating set points of one or more of the converters;

after carrying out the first mathematical optimisation, carrying out a second mathematical optimisation to determine one or more optimal current flows in the plurality of electrical elements; and control the one or more of the converters in accordance with the or each determined optimal operating set point, and controlling the power flow router or at least one of the power flow routers to achieve the or each determined optimal current flow in the plurality of electrical elements.

The features and advantages of the power transmission network of the first aspect of the invention and its embodiments apply mutatis mutandis to the method of the second aspect of the invention and its embodiments.

The method may include the step of controlling the one or more of the converters in accordance with the or each determined optimal operating set point by modifying a droop parameter of the one or more of the converters.

In the method of the invention, the first mathematical optimisation may include a multiple input, multiple output optimisation procedure.

The method may include the step of carrying out the second mathematical optimisation by creating an equivalent power transmission network configuration which represents current flow conditions in the plurality of electrical elements.

In the method of the invention, creating an equivalent power transmission network configuration which represents current flow conditions in the plurality of electrical elements may include mapping converter currents in the plurality of electrical elements.

The method may include the step of carrying out the second mathematical optimisation to determine one or more optimal current flows in the plurality of electrical elements in response to an increase or decrease in demand of power or current flow between two or more of the converters.

The method may include the step of repeating the first mathematical optimisation subsequent to carrying out the second mathematical optimisation.

The method may include the step of implementing an iterative algorithm to carry out the first mathematical optimisation and the second mathematical optimisation.

The method may include the steps of: implementing the iterative algorithm to determine an equilibrium point between the outcomes of the first and second mathematical optimisations; and to end the iterative algorithm after determining the equilibrium point. The equilibrium point may correspond to an error between consecutive values of the outcome of the first mathematical optimisation falling within a predefined tolerance band.

The method may include the step of carrying out at least one of the mathematical optimisations based on one or more constraints of the power transmission network.

The method may include the step of carrying out the first mathematical optimisation based on one or more constraints of the converters.

In the method of the invention, the or each constraint of the power transmission network may be selected from a group including, but is not limited to:

a real-time operating parameter of the power transmission network or a component of the power transmission network;

an operating set point of the power transmission network or a component of the power transmission network;

an operating rating of the power transmission network or a component of the power transmission network;

a physical property of the power transmission network or a component of the power transmission network;

a functional requirement of the power transmission network or a component of the power transmission network;

a performance requirement of the power transmission network or a component of the power transmission network.

In the method of the invention, the or each constraint of the power transmission network may be selected from a group including, but is not limited to:

a constraint of the converters;
a constraint of the electrical elements;
a constraint of the power flow routers.

In the method of the invention, the or each constraint of the converters may be selected from a group including, but is not limited to:

an operating current of a given converter;

an operating voltage of a given converter;
an operating power of a given converter;
a current rating of a given converter;
a voltage rating of a given converter;
a power rating of a given converter;
a droop parameter of a given converter;
an AC system frequency associated with a given converter;
a power quality rating of a given converter.

In the method of the invention, the or each constraint of the electrical elements may be selected from a group including, but is not limited to:
an operating current of a given electrical element;
an operating voltage of a given electrical element;
a temperature of a given electrical element;
a current carrying capacity of a given electrical element;
a current rating of a given electrical element;
a rate of change in current rating of a given electrical element;
a thermal rating of a given electrical element;
a voltage rating of a given electrical element;
a physical dimension of a given electrical element;
a predefined distribution of current loads between two or more of the electrical elements;
a balancing of current loads between two or more of the electrical elements;
a power quality rating of a given electrical element;
a transmission loss of a given electrical element.

In the method of the invention, the or each constraint of the power flow routers may be selected from a group including, but is not limited to:
a current rating of a given power flow router;
a voltage rating of a given power flow router;
a change of current flow controllable by a given power flow router in a given electrical element.

The method may include the step of carrying out at least one of the mathematical optimisations based on a plurality of constraints of the power transmission network by applying a respective weighting to each of the plurality of constraints.

In the method of the invention, the plurality of constraints of the power transmission network may include respective transmission losses of the plurality of the electrical elements, and applying a respective weighting to each of the plurality of constraints may include weighing the respective transmission losses of the plurality of electrical elements by the respective resistive components of the plurality of the electrical elements.

In the method of the invention, the power flow router or at least one of the power flow routers may be configured to be controllable to selectively modify an impedance of at least one of the plurality of electrical elements so as to control current flow in at least one of the plurality of electrical elements.

In the method of the invention, the power flow router or at least one of the power flow routers may include at least one voltage source and may be configured to be controllable to selectively inject a voltage drop, in use, into at least one of the plurality of electrical elements so as to control current flow in at least one of the plurality of electrical elements.

It will be appreciated that each electrical element may be any electrical device capable of conducting current. For example, each electrical element may be a power transmission network component, such as a power transmission medium, for use in HVDC power transmission.

A power transmission medium may be any medium that is capable of transmitting electrical power between two or more of the converters. Such a medium may be, but is not limited to, any power transmission line or cable, such as a submarine DC power transmission cable, an overhead DC power transmission line or cable and an underground DC power transmission cable.

The power transmission network and method of the invention are applicable to low-voltage, medium-voltage and high-voltage applications that involve the transmission of power in a power transmission network.

It will be appreciated that the use of the terms "first", "second" and the like in the patent specification is merely intended to help distinguish between similar features (e.g. the first and second mathematical optimisations), and is not intended to indicate the relative importance of one feature over another feature, unless specifically stated.

BRIEF DESCRIPTION OF THE DRAWINGS

Embodiments of the invention will now be described, by way of a non-limiting example, with reference to the accompanying drawings in which.

DETAILED DESCRIPTION

Figure 1:
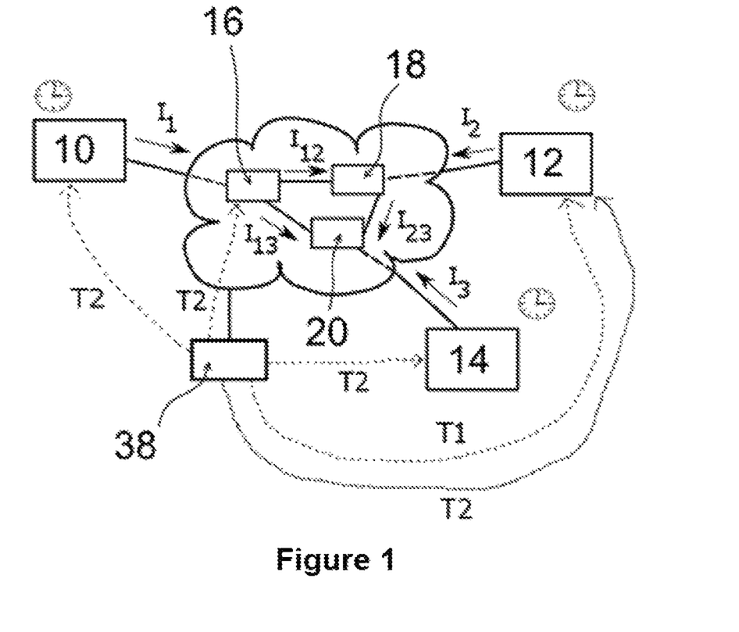
FIG. 1 shows schematically a power transmission network according to an embodiment of the invention.

A multi-terminal DC (MTDC) power transmission network according to an embodiment of the invention is shown in FIG. 1.

The MTDC power transmission network includes a plurality of converters 10, 12, 14, a power flow router in the form of a current flow control (CFC) device 16, and a plurality of electrical elements in the form of DC power transmission lines.

In the embodiment shown, each converter 10, 12, 14 is an AC-DC converter, but may be a DC-DC converter in other embodiments.

The DC sides of the plurality of converters 10, 12, 14 are interconnected via the plurality of DC power transmission lines. More specifically, in the embodiment shown, a first converter 10 is connected to the power flow router via a first DC power transmission line, a second converter 12 is connected to a first common connection node 18 via a second DC power transmission line, a third converter 14 is connected to a second common connection node 20 via a third DC power transmission line, the power flow router is connected to the first common connection node 18 via a fourth DC power transmission line, the power flow router is connected to the second common connection node 20 via a fifth DC power transmission line, and the first and second common connection nodes 18, 20 are connected via a sixth DC power transmission line.

Meanwhile the AC side of each converter 10, 12, 14 is connected to a respective AC electrical network, such as an AC power grid or an AC power source.

In FIG. 1, the current flowing in the first DC power transmission line is indicated as $I_1$, the current flowing in the second DC power transmission line is indicated as $I_2$, and the current flowing in the third DC power transmission line is indicated as $I_3$. Also, in FIG. 1, the current flowing in the fourth DC power transmission line is indicated as $I_2$, the current flowing in the fifth DC power transmission line is indicated as $I_{13}$, and the current flowing in the sixth DC power transmission line is indicated as $I_{23}$.

The current $I_1$, $I_2$, $I_3$, $I_{12}$, $I_{13}$, $I_{23}$ flowing in each DC power transmission line is imposed by the respective voltage drop across each DC power transmission line.

Figure 2A:
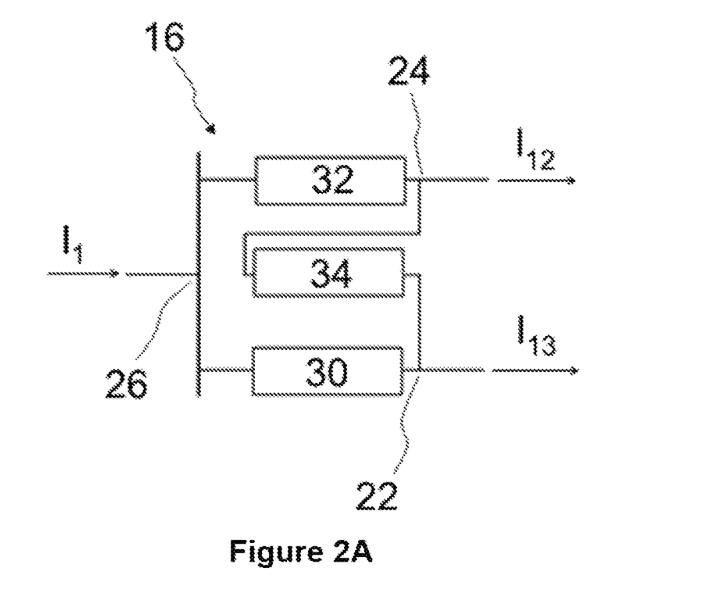
FIGS. 2A and 2B show schematically exemplary configurations of a current flow control device.

FIG. 2A shows an exemplary configuration of the CFC device 16.

The CFC device 16 comprises a plurality of connection points, a pair of bypass control elements in the form of first and second bidirectional switches 30, 32, and a voltage source 34 in the form of a controlled capacitor.

The plurality of connection points include first, second and third connection points that are connectable, in use, to the fifth, fourth and first DC power transmission lines respectively.

The third connection point is electrically connected to each of the first and second connection points. More specifically, the first bidirectional switch 30 is operatively connected between the first and third connection points, and the second bidirectional switch 32 is operatively connected between the second and third connection points. Hence, each bidirectional switch 32, 34 is switchable to selectively permit and block current flow between the third connection point and the corresponding one of the first and second connection points.

The voltage source 34 is connected between the first and second connection points. The configuration of the bidirectional switches 30, 32 and the voltage source 34 in each CFC device 16 permits operation of each bidirectional switch 32, 34 to selectively form a current bypass path to allow, in use, a current in the corresponding CFC device 16 to bypass the voltage source 34.

The above connection of the CFC device 16 permits selective modification of an impedance of at least one of the connected DC power transmission lines so as to control current flow in the connected DC power transmission lines.

The bidirectional switches 30, 32 of the CFC device 16 can be controlled to switch to a first switched state so as to permit current flow between the first and third connecting points 22, 26 and to block current flow between the second and third connecting points 24, 26. This results in a voltage drop, as provided by the voltage source 34, being injected into the fourth DC power transmission line, and thereby results in current being directed through the voltage source 34 between the first and second connecting points 22, 24.

The bidirectional switches 30, 32 can be controlled to switch to a second switched state so as to permit current flow between the second and third connecting points 24, 26 and to block current flow between the first and third connecting points 22, 26. This results in a voltage drop, as provided by the voltage source 34, being injected into the fifth DC power transmission line, and thereby results in current being directed through the voltage source 34 between the first and second connecting points 22, 24.

The bidirectional switches 30, 32 of the CFC device 16 can be controlled to switch to a third switched state so as to permit current flow between the first and third connecting points 22, 26 and to permit current flow between the second and third connecting points 24, 26. This results in the formation of a respective current bypass path between the third connecting point 26 and each of the first and second connecting points 22, 24 to allow, in use, a respective current in the CFC device 16 to bypass the voltage source 34. Thus, a voltage drop is not injected into either of the fourth and fifth DC power transmission lines, and so current is not directed through the voltage source 34 between the first and second connecting points 22, 24.

The injection of a voltage drop into a DC power transmission line creates either a positive resistance effect in which the voltage drop opposes and thereby reduces at least one current flow $I_1$, $I_2$, $I_3$, $I_{12}$, $I_{13}$, $I_{23}$ in the respective DC power transmission line, or a negative resistance effect in which the voltage drop contributes to an increase of at least one current flow $I_1$, $I_2$, $I_3$, $I_{12}$, $I_{13}$, $I_{23}$ in the respective DC power transmission line. As such, in respect of the CFC device 16, the injection of a voltage drop into a given DC power transmission line enables modification of at least one of the current flows $I_1$, $I_2$, $I_3$, $I_{12}$, $I_{13}$, $I_{23}$ in the MTDC power transmission network and thereby permits regulation of current flow $I_1$, $I_2$, $I_3$, $I_{12}$, $I_{13}$, $I_{23}$ in at least one of the DC power transmission lines to be carried out.

Switching the bidirectional switches 30, 32 of the CFC device 16 to the third switched state allows a respective current to bypass the corresponding voltage source 34, and thereby results in a configuration of the CFC device 16 in which the voltage source 34 is inhibited from carrying out regulation of current flow $I_1$, $I_2$, $I_3$, $I_{12}$, $I_{13}$, $I_{23}$ in the DC power transmission lines.

The manner of control of current flow $I_1$, $I_2$, $I_3$, $I_{12}$, $I_{13}$, $I_{23}$ in each DC power transmission line may vary. For example, the control of current flow $I_1$, $I_2$, $I_3$, $I_{12}$, $I_{13}$, $I_{23}$ in each DC power transmission line so as to control current flow $I_1$, $I_2$, $I_3$, $I_{12}$, $I_{13}$, $I_{23}$ in the MTDC power transmission network may be selected from a group of functions including, but is not limited to:

increasing or decreasing current flow $I_1$, $I_2$, $I_3$, $I_{12}$, $I_{13}$, $I_{23}$ in at least one of the DC power transmission lines;

limiting current flow $I_1$, $I_2$, $I_3$, $I_{12}$, $I_{13}$, $I_{23}$ in at least one of the DC power transmission lines below a predefined current limit;

reducing current flow $I_1$, $I_2$, $I_3$, $I_{12}$, $I_{13}$, $I_{23}$ in at least one of the DC power transmission lines to zero or substantially zero;

balancing the current flows $I_1$, $I_2$, $I_3$, $I_{12}$, $I_{13}$, $I_{23}$ in two or more of the DC power transmission lines;

reversing current flow $I_1$, $I_2$, $I_3$, $I_{12}$, $I_{13}$, $I_{23}$ in the DC power transmission line or at least one of the DC power transmission lines.

The interconnectivity between the various DC power transmission lines in the MTDC power transmission network permits the CFC device 16 to not only directly control current flow $I_1$, $I_{12}$, $I_{13}$ in each connected DC power transmission line, i.e. the first, fourth and fifth DC power transmission lines, but also indirectly control current flow $I_2$, $I_3$, $I_{23}$ in one or more other DC power transmission lines, i.e. the second, third and sixth DC power transmission lines.

In the foregoing manner the CFC device 16 is configured to be controllable to selectively control current flow $I_1$, $I_2$, $I_3$, $I_{12}$, $I_{13}$, $I_{23}$ in the plurality of DC power transmission lines so as to direct power between two or more of the plurality of converters 10, 12, 14.

In other embodiments of the invention, it is envisaged that the configuration of the CFC device may vary. For example, the number of voltage sources and bypass control elements in the CFC device may vary so long as the CFC device is operable to inject a voltage drop into a corresponding DC power transmission line and to bypass the or each voltage source. For example, one or more additional switches may be connected with the voltage source between the first and second connecting points to permit switching of the voltage source into and out of circuit between the first and second connecting points.

Figure 2B:
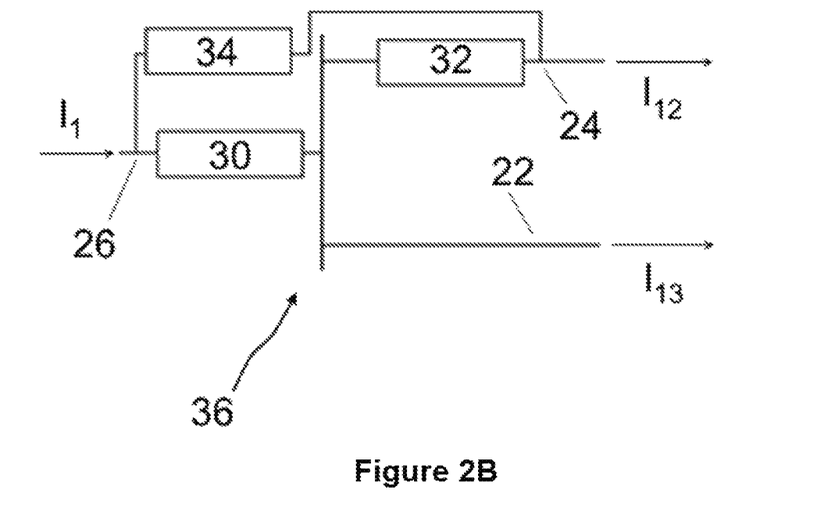

FIG. 2B shows an alternative exemplary variant 36 of the CFC device 16. The variant 36 is similar in structure and operation to the CFC device 16 of FIG. 2A, and like features share the same reference numerals.

The variant 36 differs from the CFC device 16 of FIG. 2A in that, in the variant 36:

the first bidirectional switch 30 is operatively connected between the first and third connecting points 22, 26;

the second bidirectional switch 32 is operatively connected between the first and second connecting points 22, 24; and the voltage source 34 is connected between the second and third connecting points 24, 26.

The bidirectional switches 30, 32 of the variant 36 can be controlled to switch to a first switched state so as to permit current flow between the first and third connecting points 22, 26 and to block current flow between the first and second connecting points 22, 24. This results in a voltage drop, as provided by the voltage source 34, being injected into the fourth DC power transmission line, and thereby results in current being directed through the voltage source 34 between the second and third connecting points 24, 26.

The bidirectional switches 30, 32 of the variant 36 can be controlled to switch to a second switched state so as to permit current flow between the first and second connecting points 22, 24 and to block current flow between the first and third connecting points 22, 26. This results in a voltage drop, as provided by the voltage source 34, being injected into the first DC power transmission line, and thereby results in current being directed through the voltage source 34 between the second and third connecting points 24, 26.

The bidirectional switches 30, 32 of the variant 36 can be controlled to switch to a third switched state so as to permit current flow between the first and second connecting points 22, 24 and to permit current flow between the first and third connecting points 2222, 26. This results in the formation of a respective current bypass path between the first connecting point and each of the second and third connecting points 24, 26 to allow, in use, a respective current in the variant 36 to bypass the voltage source 34. Thus, a voltage drop is not injected into either of the first and fourth DC power transmission lines, and so current is not directed through the voltage source 34 between the second and third connecting points 24, 26.

The power transmission network further includes a controller configured to selectively control the plurality of converters 10, 12, 14 and the power flow router to control power flow in the power transmission network.

In an embodiment of the invention, the controller includes a global control unit 38 and a plurality of local control units (not shown).

The global control unit 38 is configured to be in communication with a respective local control unit associated with each converter 10, 12, 14, e.g. by way of fibre-optic cables, so that the global control unit 38 can send control signals to each local control unit to operate the respective converter as well as receive feedback from each local control unit. In addition, in other embodiments of the invention, the global control unit may be centralised in one node or distributed among a set of nodes in the MTDC power transmission.

Furthermore, in still other embodiments of the invention, one of the local control units may be configured to function as the global control unit 38.

The global control unit 38 is further configured to be in communication with a local control unit associated with the CFC device 16, e.g. by way of fibre-optic cables, so that the global control unit 38 can send control signals to the local control unit to operate the CFC device 16 as well as receive feedback from the local control unit. In the embodiment shown, the global control unit 38 is configured to provide a current reference to the local control unit associated with the CFC device 16 in order to control the switching of the bidirectional switches 30, 32.

The global control unit 38 can also act as a gateway for communication between different local control units.

Operation of the power transmission network of FIG. 1 is described as follows.

The inventors have found that the power transmission network of FIG. 1 can be analogously compared with a computer network. More specifically, each converter 10, 12, 14 can be considered to be equivalent to a respective end host, and the capability of the power flow router to direct power between two or more of the plurality of converters 10, 12, 14 means that the power flow router, i.e. the CFC device 16, can be considered to be equivalent to an intermediate network router that directs messages in the network.

In the embodiment shown, the local control units are equipped with Global Positioning System clocks in order to synchronize the operation of the converters 10, 12, 14. This allows a local control unit associated with one converter to communicate a power transfer request to a local control unit associated with another converter in order to schedule a positive or negative power transfer with given parameters via a so-called message sent through the MTDC power transmission network. Such a message can be called a powergram which is analogous to a datagram used in a computer network.

The use of powergrams in this manner can be used to provide additional power capabilities to one or more converters 10, 12, 14 requiring power/energy to meet the respective power demand and/or energy balancing requirements.

In response to a demand of power (or an increase/decrease in demand of power) of at least one of the converters 10, 12, 14, the global control unit 38 carries out a first mathematical optimisation to select at least one other of the converters 10, 12, 14, and controls the or each selected converter to modify its power contribution or consumption by way of a respective powergram so as to meet the or each demand of power (or increase/decrease in demand of power) of the at least one of the converters 10, 12, 14.

The first mathematical optimisation permits the optimisation of the control of the or each selected converter with regard to a cost function based on chosen criteria or constraints in order to achieve the object of maximising the efficiency of the operation of the power transmission network whilst operating within its ratings and meeting specified power requirements. The or each chosen criteria or constraint may be a constraint of the converters 10, 12, 14.

The or each constraint of the converters 10, 12, 14 may be selected from a group including, but is not limited to:

an operating current $I_1$, $I_2$, $I_3$ of a given converter;
an operating voltage $V_1$, $V_2$, $V_3$ of a given converter;
an operating power $P_1$, $P_2$, $P_3$ of a given converter;
a minimum or maximum current rating of a given converter;

a minimum or maximum voltage rating of a given converter;

a minimum or maximum power rating of a given converter;

a droop parameter of a given converter;

an AC system frequency associated with a given converter;

a power quality rating of a given converter.

Thereafter, the global control unit 38 carries out the first mathematical optimisation to determine steady-state optimal operating set points of the converters 10, 12, 14; and control the converters 10, 12, 14 in accordance with the determined optimal operating set points. The first mathematical optimisation may be carried out to take into account potential contingency events and any scheduled power transfers based on powergram exchange. The optimal operating set points may include operating voltages and droop parameters of the converters 10, 12, 14.

Figure 4:
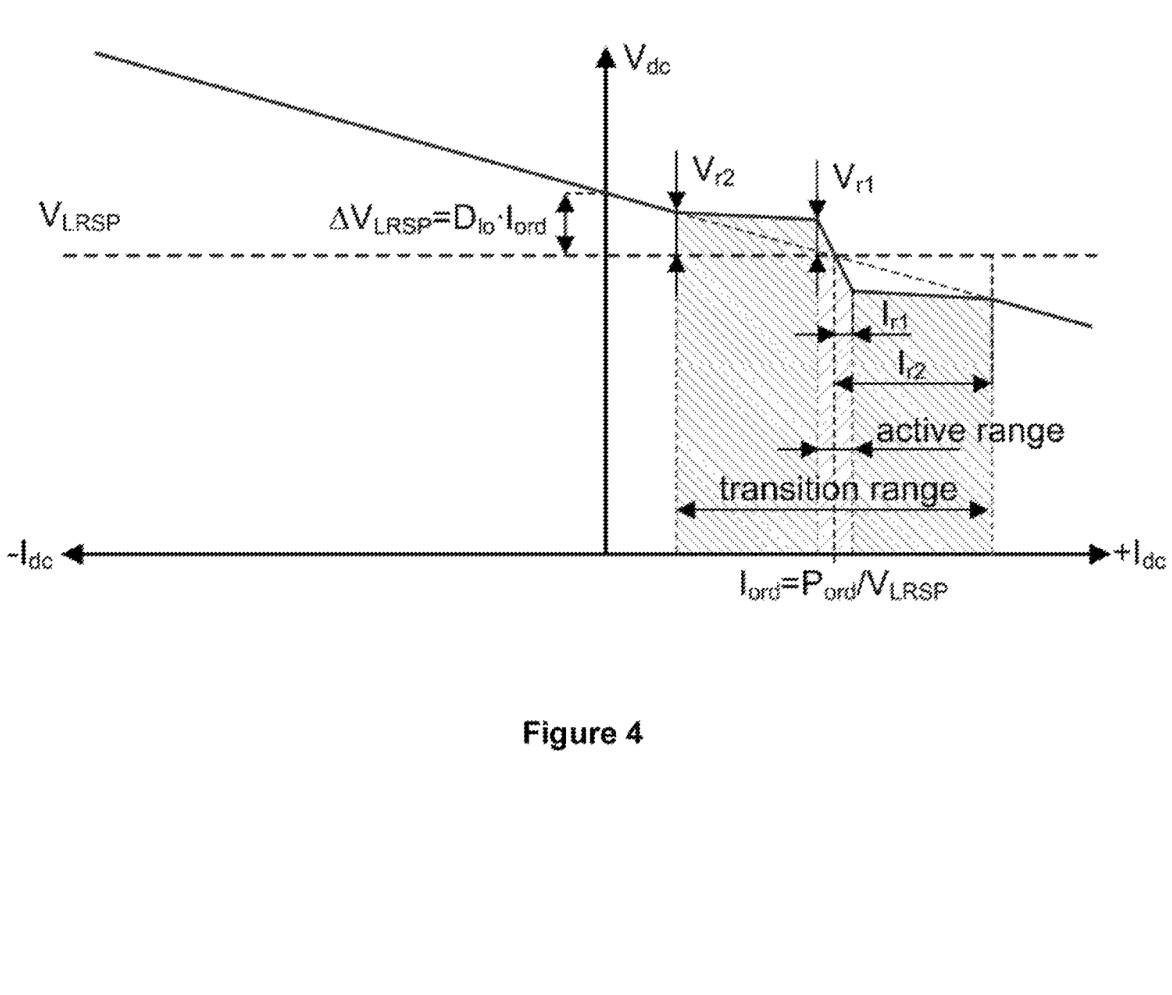
FIG. 4 shows an exemplary voltage-current (V-I) droop of a converter of the power transmission network of FIG. 1.

FIG. 4 shows an exemplary V-I droop of a converter of the power transmission network, where the V-I droop consists of linear and non-linear portions. The optimal nonlinear portions of the V-I droop can be derived based on the number of exchanged powergrams for a given period of time. Additionally the optimal V-I droops may be obtained by solving a multiple-input, multiple-output (MIMO) optimisation problem by considering the converters 10, 12, 14 as connected via DC power transmission lines, which can be modelled as a linear, time-invariant (LTI) system.

The global control unit 38 then sends a transmission T2 including the optimal operating set points to the local control units of the converters 10, 12, 14 to reconfigure the operation of the converters 10, 12, 14.

To illustrate the working of the invention, with reference to FIG. 1, assume that the currents $I_1$, $I_2$, $I_3$ flowing in the first, second and third DC power transmission lines are 1000 A, 500 A and −1500 A respectively. Assume an increase in demand of power by the third converter 14 that leads to an increase in the absolute value of $I_3$ by 100 A. In the case where the first converter 10 is incapable of providing any more active power to the MTDC power transmission network, the second converter 12 is selected using the first mathematical optimisation to provide the necessary powergram and additional current to meet the increase in demand of power by the third converter 14. The global control unit 38 therefore sends a power transfer request T1 to the local control unit associated with the second converter 12, which results in the second converter 12 sending a powergram to the third converter 14 and thereby results in a change in the absolute value of $I_2$ by 100 A.

The CFC device 16 is controllable, in use, to selectively control current flow $I_1$, $I_2$, $I_3$, $I_{12}$, $I_{13}$, $I_{23}$ in the plurality of DC power transmission lines so as to direct the or each powergram between two or more of the plurality of converters 10, 12, 14.

Applying the Superposition Principle, $\Delta I_2 = -\Delta I_3 = 100$ A, whereas $\Delta I_1 = 0$. As mentioned below, these constraints on the currents $I_1$, $I_2$, $I_3$ flowing in the first, second and third DC power transmission lines results in an infinite number of solutions for the currents $I_{12}$, $I_{13}$, $I_{23}$ flowing in the fourth, fifth and sixth DC power transmission lines. For example, one simple solution would be $\Delta I_{23} = 100$ A, $\Delta I_{12} = \Delta I_{13} = 0$, while another solution could be $-\Delta I_{12} = \Delta I_{13} = \Delta I_{23} = 50$ A.

The inventors have found that the current flows $I_{12}$, $I_{13}$, $I_{23}$ in the fourth, fifth and sixth DC power transmission lines can be optimised through the configuration of the global control unit 38 to: carry out a second mathematical optimisation to determine the optimal current flows $I_{12}$, $I_{13}$, $I_{23}$ in the fourth, fifth and sixth DC power transmission lines; and control the CFC device 16 to achieve the determined optimal current flows $I_{12}$, $I_{13}$, $I_{23}$ in the fourth, fifth and sixth DC power transmission lines.

Such mathematical optimisation involves the calculation of optimal current references for the CFC device 16 by minimising a cost function, which is composed of one or more constraints of the MTDC power transmission network, until an optimal solution is found. In addition the cost function could be composed of a weighted sum of a plurality of constraints of the MTDC power transmission network. This is analogous to routing decisions made by network routers which define cost functions (also known as metrics) based on network congestion and number of hops to reach a given end host.

Figure 3:
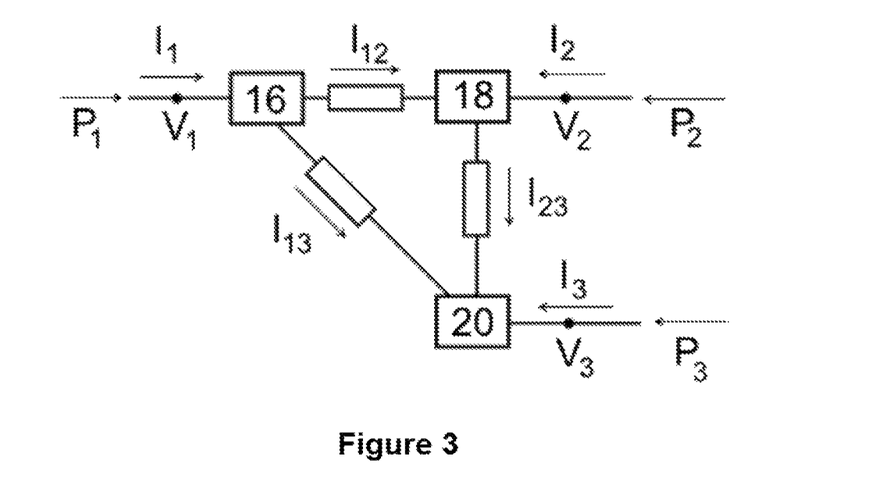
FIG. 3 shows a schematic representation of an equivalent power transmission network configuration of the power transmission network of FIG. 1.

The global control unit 38 is configured to carry out the second mathematical optimisation by creating an equivalent power transmission network configuration which represents current flow conditions in the plurality of DC power transmission lines, as show in FIG. 3. This includes mapping the converter currents $I_1$, $I_2$, $I_3$ flowing in the first, second and third DC power transmission lines.

The system of equations for the currents $I_1$, $I_3$, $I_3$, $I_{12}$, $I_{13}$, $I_{23}$ shown in FIG. 3 is set out as follows:

$$I_{12} + I_{13} = I_1$$

$$-I_{12} + I_{23} = I_2$$

$$-I_{13} - I_{23} = I_3$$

For clarity, the currents $I_{12}$, $I_{13}$, $I_{23}$ in the fourth, fifth and sixth DC power transmission lines are relabeled as follows:

$$X_1 = I_{12}$$

$$X_2 = I_{13}$$

$$X_3 = I_{23}$$

The above system of equations can be expressed in matrix form as:

$$\begin{bmatrix} 1 & 1 & 0 \\ -1 & 0 & 1 \\ 0 & -1 & -1 \end{bmatrix} \cdot \begin{bmatrix} X_1 \\ X_2 \\ X_3 \end{bmatrix} = \begin{bmatrix} I_1 \\ I_2 \\ I_3 \end{bmatrix}$$

where $$A = \begin{bmatrix} 1 & 1 & 0 \\ -1 & 0 & 1 \\ 0 & -1 & -1 \end{bmatrix}$$

Since det(A)=0 which indicates that the matrix is underdetermined, i.e. there are an infinite number of solutions for $X_1$, $X_2$ and $X_3$ for a given constraint defined by the converter currents $I_1$, $I_2$, $I_3$. This gives rise to an optimisation problem, in which optimal values of $X_1$, $X_2$ and $X_3$ are determined so as to obtain a minimum cost of a given cost function.

As mentioned above, the cost function can be composed of one or more constraints of the MTDC power transmission network. For example, the or each constraint of the MTDC power transmission network may be selected from a group including, but is not limited to:

a real-time operating parameter of the MTDC power transmission network or a component of the MTDC power transmission network;

an operating set point of the MTDC power transmission network or a component of the MTDC power transmission network;

an operating rating of the MTDC power transmission network or a component of the MTDC power transmission network;

a physical property of the MTDC power transmission network or a component of the MTDC power transmission network;

a functional requirement of the MTDC power transmission network or a component of the MTDC power transmission network;

a performance requirement of the MTDC power transmission network or a component of the MTDC power transmission network.

a constraint of the converters 10, 12, 14;

a constraint of the DC power transmission lines;

a constraint of the power flow router.

The or each constraint of the converters 10, 12, 14 may be selected from a group including, but is not limited to:

an operating current $I_1$, $I_2$, $I_3$ of a given converter;

an operating voltage $V_1$, $V_2$, $V_3$ of a given converter;

an operating power $P_1$, $P_2$, $P_3$ of a given converter;

a minimum or maximum current rating of a given converter;

a minimum or maximum voltage rating of a given converter;

a minimum or maximum power rating of a given converter;

a droop parameter of a given converter;

an AC system frequency associated with a given converter;

a power quality rating of a given converter.

The or each constraint of the DC power transmission lines may be selected from a group including, but is not limited to:

an operating current $I_1$, $I_2$, $I_3$, $I_{12}$, $I_{13}$, $I_{23}$ of a given DC power transmission line;

an operating voltage $V_1$, $V_2$, $V_3$ of a given DC power transmission line;

a temperature of a given DC power transmission line;

a current carrying capacity of a given DC power transmission line;

a minimum or maximum current rating of a given DC power transmission line;

a rate of change in current rating of a given DC power transmission line;

a thermal rating of a given DC power transmission line;

a minimum or maximum voltage rating of a given DC power transmission line;

a physical dimension of a given DC power transmission line, e.g. line length;

a predefined distribution of current loads between two or more of the DC power transmission lines;

a balancing of current loads between two or more of the DC power transmission lines;

a power quality rating of a given DC power transmission line;

a transmission loss of a given DC power transmission line, which corresponds to operational costs of the MTDC power transmission network.

The or each constraint of the power flow router may be selected from a group including, but is not limited to:

a minimum or maximum current rating of the power flow router;

a minimum or maximum voltage rating of the power flow router;

a change of current flow controllable by the power flow router in a given DC power transmission line.

An exemplary cost function may be composed of a linear combination of the steady-state DC conduction losses of the fourth, fifth and sixth DC power transmission lines weighed by their respective resistive components at DC. Each resistive component at DC can be described by the corresponding DC power transmission line's transfer function in the frequency domain, denoted as $H_k(\omega)$, evaluated at $\omega=0$.

An initial approach to the cost function J to be minimised has the form:

$$J(X_1, X_2, X_3) = \Sigma_{k=1}^3 |H_k(0)|(X_k)^2$$

In order to maximise the lifetime of the fourth, fifth and sixth DC power transmission lines, their current and/or thermal ratings can be included in the cost function J in order to per-unitise the currents $I_{12}$, $I_{13}$, $I_{23}$ flowing in the of the fourth, fifth and sixth DC power transmission lines with respect to their maximum allowable values, denoted as $X_{k_{MAX}}$. The maximum allowable values can also be included in the optimisation problem as inequality constraints in order to restrict solutions that fall outside the feasible region. Other possible components of the cost function J could be the ambient temperature and/or the core temperature of the fourth, fifth and sixth DC power transmission lines.

Additionally the respective changes $X_q$ of current flow controllable by the power flow router in the fourth, fifth and sixth DC power transmission lines can be included as constraints to the optimisation problem. For example, the respective changes $X_q$ of current flow can be limited to the respective maximum allowable values $\Delta X_{P_{MAX}}$ for an observation period Ts.

Therefore, the optimisation problem can be stated as:

$$\text{Minimise } J(X_1, X_2, X_3) = \sum_{k=1}^{3} |H_k(0)| \left(\frac{X_k}{X_{k_{MAX}}}\right)^2$$

Subject to $$X_1 + X_2 = I_1$$

$$-X_1 + X_3 = I_2$$

$$-X_{k_{MAX}} < X_k < X_{k_{MAX}} \quad k = 1, 2, 3$$

$$-\Delta X_{P_{MAX}} < |X_q(t) - X_q(t - T_s)| < \Delta X_{P_{MAX}} \quad p, q = 1, 2, 3$$

The solution to the optimisation problem, i.e. the optimal current flows $I_{12}$, $I_{13}$, $I_{23}$ in the fourth, fifth and sixth DC power transmission lines, can be determined by employing convex optimisation methods, or by employing numerical methods whenever a closed-solution cannot be found. In turn, the solution to the optimisation problem is used to define optimal current references for the CFC device 16 to control the CFC device 16 to achieve the determined optimal current flows $I_{12}$, $I_{13}$, $I_{23}$ in the fourth, fifth and sixth DC power transmission lines. The global control unit 38 then sends a transmission T2 including the optimal current references to the local control unit of the CFC device 16 to reconfigure the operation of the CFC device 16.

The global unit carries out the aforementioned second mathematical optimisation to determine the optimal current flows $I_{12}$, $I_{13}$, $I_{23}$ in the fourth, fifth and sixth DC power transmission lines; and control the CFC device 16 to achieve the determined optimal current flows in the fourth, fifth and sixth DC power transmission lines.

Carrying out the aforementioned second mathematical optimisation, i.e. selecting the best current flows (with regard to chosen criteria or constraints) from a set of available alternatives, allows the instantaneous calculation of each optimal current flow to meet a number of criteria or constraints designed to maximise the efficiency of the operation of the MTDC power transmission network whilst operating within its ratings and meeting specified power requirements.

Advantageously the MTDC power transmission network configured in the foregoing manner has the flexibility to accommodate additional criteria or constraints on the operation of the MTDC power transmission network, whereby the additional criteria or constraints may be permanent or temporary.

It will be appreciated that, although the above optimisation problem is formulated with reference to the fourth, fifth and sixth DC power transmission lines, the optimisation problem in other embodiments may be formulated based on any single one of the first to sixth DC power transmission lines or any combination of two or more of the first to sixth DC power transmission lines.

The second mathematical optimisation of the current flows $I_{12}$, $I_{13}$, $I_{23}$ in the fourth, fifth and sixth DC power transmission lines in the foregoing manner may affect the MTDC power transmission network to the extent that the previously optimised control of the converters 10, 12, 14 is rendered sub-optimal, since the fourth, fifth and sixth DC power transmission lines can be seen as variable resistors interconnecting the converters 10, 12, 14.

To minimise the aforementioned effect of the second mathematical optimisation of the current flows $I_{12}$, $I_{13}$, $I_{23}$ in the fourth, fifth and sixth DC power transmission lines on the control of the converters 10, 12, 14, the global control unit 38 is configured to implement an iterative algorithm to carry out the first mathematical optimisation and the second mathematical optimisation in order to establish an equilibrium point between the outcomes of the first mathematical optimisation and the second mathematical optimisation.

Figure 5:
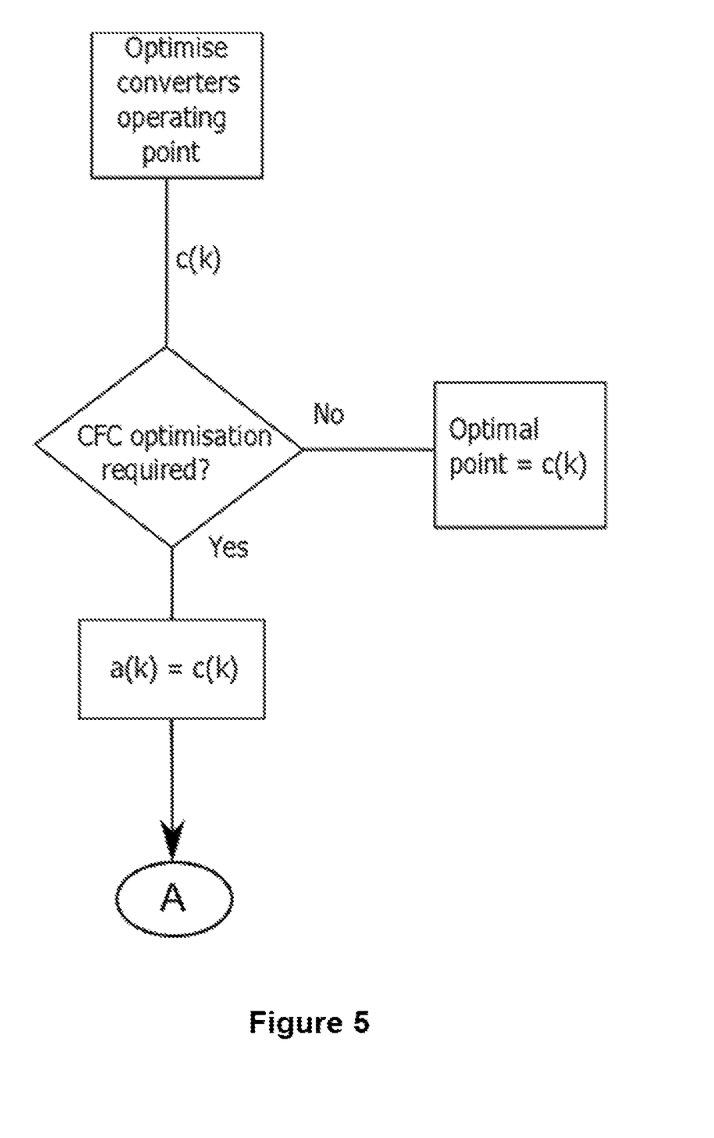
FIG. 5 shows a flowchart of optimisation steps for controlling power flow in the power transmission network of FIG. 1.

In the iterative algorithm shown in FIG. 5, a(k) refers to the optimal operating set points of the converters 10, 12, 14 when the second mathematical optimisation of the current flows $I_{12}$, $I_{13}$, $I_{23}$ in the fourth, fifth and sixth DC power transmission lines is required, b(k) refers to the optimal current references of the CFC device 16, and c(k) refers to the optimal operating set points of the converters 10, 12, 14 when the second mathematical optimisation of the current flows $I_{12}$, $I_{13}$, $I_{23}$ in the fourth, fifth and sixth DC power transmission lines is not required.

Initially the operating set points of the converters 10, 12, 14 are optimised via the aforementioned first mathematical optimisation in response to a demand of power of at least one of the converters 10, 12, 14. If the second mathematical optimisation of the current flows $I_{12}$, $I_{13}$, $I_{23}$ in the fourth, fifth and sixth DC power transmission lines is not required, the iterative algorithm outputs the optimal operating set points c(k) of the converters 10, 12, 14.

When the second mathematical optimisation of the current flows $I_{12}$, $I_{13}$, $I_{23}$ in the fourth, fifth and sixth DC power transmission lines is required, the aforementioned optimal operating set points c(k) of the converters 10, 12, 14 is stored as an initial value of the optimal operating set points a(k) of the converters 10, 12, 14.

At time instant k, the value of the optimal operating set points a(k) of the converters 10, 12, 14 is compared to a previous value of the optimal operating set points a(k−1) of the converters 10, 12, 14. Thereafter, the second mathematical optimisation of the current flows $I_{12}$, $I_{13}$, $I_{23}$ in the fourth, fifth and sixth DC power transmission lines is carried out to obtain a new set of optimal current references b(k) of the CFC device 16, and then the first mathematical optimisation is repeated to obtain a new value of the optimal operating set points a(k) of the converters 10, 12, 14. These steps are repeated until the error between consecutive values of a(k) is within a predefined tolerance band, at which point the iterative algorithm then outputs the optimal operating set points a(k) of the converters 10, 12, 14 and the optimal current references b(k) of the CFC device 16. The iterative algorithm is then ended.

In this manner the controller is configured to implement an iterative algorithm to carry out the first mathematical optimisation and the second mathematical optimisation in order to determine an equilibrium point between the outcomes of the first mathematical optimisation and the second mathematical optimisation.

It will be appreciated that the topology of the MTDC power transmission network of FIG. 1 was merely chosen to help illustrate the working of the invention, and that the invention is applicable mutatis mutandis to other types and topologies of power transmission networks. For example, the invention is applicable mutatis mutandis to different power transmission networks having different numbers of converters, electrical elements and power flow routers, and different arrangements of the converters, electrical elements and power flow routers.

It will be also appreciated that, in other embodiments of the invention, the second mathematical optimisation may include the use of graph theory algorithms, such as the shortest path algorithm (Dijkstra's algorithm), to determine the best routes for current flows in the MTDC power transmission network.

What we claim is:

1. A DC power transmission network comprising:
a plurality of converters interconnected via a plurality of electrical elements wherein the electrical elements are DC power transmissions lines or cables;
at least one power flow router, the at least one power flow router being operatively connected to at least a first, second, and third of the plurality of electrical elements, the at least one power flow router comprising:
bypass control elements configured to be controllable to selectively control current flow in at least two of the first, second, and third of the plurality of electrical elements so as to direct power between two or more of the plurality of converters; and
a controller configured to selectively control the plurality of converters and the at least one power flow router to control power flow in the DC power transmission network;
wherein the controller is configured to:
at least one voltage source controllable to selectively inject a voltage drop into at least one of the plurality of electrical elements so as to control current flow in at least one of the plurality of electrical elements;
carry out a first mathematical optimisation to determine one or more optimal operating set points of one or more of the converters;
after carrying out the first mathematical optimisation, carry out a second mathematical optimisation to determine one or more optimal current flows in the plurality of electrical elements; and
control the one or more of the converters in accordance with the or each determined optimal operating set point, and control the at least one power flow router to achieve the determined one or more optimal current flows in the plurality of electrical elements, wherein the controller is configured to implement an iterative algorithm to carry out the first mathematical optimization and the second mathematical optimization to determine an equilibrium point between outcomes of the first and second mathematical optimizations, and to end the iterative algorithm after determining the equilibrium point.

2. The DC power transmission network according to claim 1 wherein the controller is configured to control the one or more of the converters in accordance with the or each determined optimal operating set point by modifying a droop parameter of the one or more of the converters.

3. The DC power transmission network according to claim 1, wherein the first mathematical optimisation includes a multiple input, multiple output optimisation procedure.

4. The DC power transmission network according to claim 1, wherein the controller is configured to carry out the second mathematical optimisation by creating an equivalent power transmission network configuration which represents current flow conditions in the plurality of electrical elements.

5. The DC power transmission network according to claim 4, wherein creating the equivalent power transmission network configuration which represents the current flow conditions in the plurality of electrical elements includes mapping converter currents in the plurality of electrical elements.

6. The DC power transmission network according to claim 1, wherein the controller is configured to carry out the second mathematical optimisation to determine the one or more optimal current flows in the plurality of electrical elements in response to an increase or decrease in demand of power or current flow between two or more of the converters.

7. The DC power transmission network according to claim 1, wherein the controller is configured to repeat the first mathematical optimisation subsequent to carrying out the second mathematical optimisation.

8. The DC power transmission network according to claim 1, wherein the equilibrium point corresponds to an error between consecutive values of the outcome of the first mathematical optimisation falling within a predefined tolerance band.

9. The DC power transmission network according to claim 1, wherein the controller is configured to carry out at least one of the first and second mathematical optimisations based on one or more constraints of the DC power transmission network.

10. The DC power transmission network according to claim 9, wherein the controller is configured to carry out the first mathematical optimisation based on one or more constraints of the converters.

11. The DC power transmission network according to claim 9, wherein each of the one or more constraints of the DC power transmission network is selected from a group including:
   a real-time operating parameter of the DC power transmission network or a first component of the DC power transmission network;
   an operating set point of the DC power transmission network or a second component of the DC power transmission network;
   an operating rating of the DC power transmission network or a third component of the DC power transmission network;
   a physical property of the DC power transmission network or a fourth component of the DC power transmission network;
   a functional requirement of the DC power transmission network or a fifth component of the DC power transmission network; and
   a performance requirement of the DC power transmission network or a sixth component of the DC power transmission network.

12. The DC power transmission network according to claim 9, wherein each of the one or more constraints of the DC power transmission network is selected from a group including:
   a constraint of the converters;
   a constraint of the electrical elements; and
   a constraint of the at least one power flow router.

13. The DC power transmission network according to claim 10, wherein each of the one or more constraints of the converters is selected from a group including:
   an operating current of a given converter;
   an operating voltage of the given converter;
   an operating power of the given converter;
   a current rating of the given converter;
   a voltage rating of the given converter;
   a power rating of the given converter;
   a droop parameter of the given converter;
   an AC system frequency associated with the given converter; and
   a power quality rating of the given converter.

14. The DC power transmission network according to claim 12, wherein the constraint of the electrical elements is selected from a group including:
   an operating current of a given electrical element;
   an operating voltage of the given electrical element;
   a temperature of the given electrical element;
   a current carrying capacity of the given electrical element;
   a current rating of the given electrical element;
   a rate of change in current rating of the given electrical element;
   a thermal rating of the given electrical element;
   a voltage rating of the given electrical element;
   a physical dimension of the given electrical element;
   a predefined distribution of current loads between two or more of the electrical elements;
   a balancing of current loads between two or more of the electrical elements;
   a power quality rating of the given electrical element; and
   a transmission loss of the given electrical element.

15. The DC power transmission network according to claim 12, wherein the constraint of the at least one power flow router is selected from a group including:
   a current rating of a given power flow router;
   a voltage rating of the given power flow router; and
   a change of current flow controllable by the given power flow router in a given electrical element.

16. The DC power transmission network according to claim 9, wherein the controller is configured to carry out at least one of the first and second mathematical optimisations based on the one or more constraints of the DC power transmission network by applying a respective weighting to each of the plurality of constraints.

17. The DC power transmission network according to claim 16, wherein the plurality of constraints of the DC power transmission network includes respective transmission losses of the plurality of the electrical elements, and applying the respective weighting to each of the plurality of constraints includes weighing the respective transmission losses of the plurality of the electrical elements by respective resistive components of the plurality of the electrical elements.

18. The DC power transmission network according to claim 1, wherein the at least one power flow router is configured to be controllable to selectively modify an impedance of at least one of the plurality of electrical elements so as to control the current flow in at least one of the plurality of electrical elements.

* * * * *